United States Patent
Daroux et al.

(10) Patent No.: US 6,207,271 B1
(45) Date of Patent: Mar. 27, 2001

(54) PACKAGING MATERIAL FOR HERMETICALLY SEALED BATTERIES

(75) Inventors: Mark L. Daroux, Cleveland Heights; David A. Glover, Parma, both of OH (US)

(73) Assignee: NTK Powerdex, Inc., Eastlake, OH (US)

( * ) Notice: Subject to any disclaimer, the term of this patent is extended or adjusted under 35 U.S.C. 154(b) by 0 days.

(21) Appl. No.: 09/271,955

(22) Filed: Mar. 18, 1999

Related U.S. Application Data

(60) Provisional application No. 60/078,418, filed on Mar. 18, 1998.

(51) Int. Cl.⁷ .................. B32B 15/04; B32B 7/12
(52) U.S. Cl. ................. 428/344; 428/335; 428/354
(58) Field of Search .................. 428/220, 332, 428/343, 325, 458, 354

(56) References Cited

U.S. PATENT DOCUMENTS

| | | | |
|---|---|---|---|
| 3,239,380 | 3/1966 | Berchielli | 136/6 |
| 3,375,136 | 3/1968 | Biggar | 136/6 |
| 3,494,796 | 2/1970 | Grulke et al. | 136/83 |
| 3,572,499 | 3/1971 | Mondano | 206/1 |
| 3,770,122 | 11/1973 | Thiele | 206/84 |
| 4,022,206 | 5/1977 | Hilleman et al. | 128/216 |
| 4,135,622 | 1/1979 | Glick | 206/63.3 |
| 4,284,672 | 8/1981 | Stillman | 428/35 |
| 4,647,714 | 3/1987 | Goto | 174/36 |
| 4,751,614 * | 6/1988 | Mehnert | 361/437 |
| 4,785,937 | 11/1988 | Tamezawa et al. | 206/484 |
| 4,840,831 | 6/1989 | Schraven et al. | 428/152 |
| 4,965,408 * | 10/1990 | Chapman et al. | 174/35 MS |
| 4,980,223 * | 12/1990 | Nakano et al. | 428/198 |
| 5,227,264 | 7/1993 | Duval et al. | 429/153 |

OTHER PUBLICATIONS

Surlyn 1652—For Blown/Cast Film and Extrusion Coating.
Surlyn—Premium Performance for Superior Packaging Value.
Surlyn/Nucrel—Safety in Handling and Use.

* cited by examiner

Primary Examiner—Bruce H. Hess
Assistant Examiner—B. Shewareged
(74) Attorney, Agent, or Firm—Mark Kusner

(57) ABSTRACT

A flexible laminate for packaging a polymer electrolytic cell or battery, comprising:

a first metallic foil layer;

a second metallic foil layer;

an intermediate separation layer disposed between the first and second metallic foil layers, the intermediate separation layer establishing a predetermined spacing between the first layer metallic foil and the second metallic foil layer;

a first layer formed of a first self-sealing polymer on the first metallic foil layer.

18 Claims, 2 Drawing Sheets

PACKAGING MATERIAL FOR HERMETICALLY SEALED BATTERIES

This application claims benefit to application Ser. No. 60/078,418, filed Mar. 18, 1998.

FIELD OF THE INVENTION

The present invention relates generally to packaging material, and more particularly, to a flexible laminate for packaging and hermetically sealing an electrochemical device. The invention is particularly applicable for packaging electrolytic cells and batteries, and will be described with particular reference thereto. Although, it will be appreciated that the present invention may find advantageous application in packaging electrochemical devices that utilize polymer electrolytes or that require hermetic packaging to isolate the device from the environment.

BACKGROUND OF THE INVENTION

Improvements in microelectronics have increased the demand for electrolytic cells that can be directly incorporated into electronic devices so as to produce a portable, finished package. As the improvements in microelectronics reduce the size of the electronic device, the space and weight allotted to a power supply within such device have likewise decreased. It is therefore important to maximize the power-per-unit space that a battery can provide, but at the same time, minimize weight and fully utilize the space allotted to a power supply within an electronic device. The use of flexible packaging to enclose an electrolytic battery or cell is one way to reduce the weight of a battery or cell, and such packaging lends itself to unusual shapes. Flexible packaging can still provide hermetic containment of a battery, and in addition, is lighter than traditional packaging, i.e., metal cans or molded plastic cases. Flexible packaging also conforms more easily to the shape of the battery structure.

The flexible packaging may be formed of a single layer of a polymer film or single layer of a metal foil, but is typically comprised of a multi-layer material having a polymer layer for toughness, a metal foil layer to form a hermetic barrier and a third layer of an adhesive or sealant material. This multi-layer material is dimensioned to be tightly wrapped, e.g., to be folded, around a battery or cell. Heat and pressure are typically applied to overlapping edges of the material to form a seal enclosing the cell or battery. Operations such as folding of the material and the tight wrapping necessary for efficient packaging of the battery or cell place considerable stress on the various layers forming the material. Such stresses may lead to cracks forming in the metal foil layer. Such cracks, in addition to "pinhole imperfections" that may exist in the foil, can destroy the hermeticity of the packaging and allow solvents to escape from the battery or water vapor and oxygen to penetrate into the battery. Increasing the thickness of the foil layer sufficiently to avoid hermeticity issues can require undesirable increases in weight, thickness, stiffness and cost.

The present invention overcomes these and other problems and provides a multi-layer, flexible material for forming a package for an electrochemical device such as an electrolytic battery or cell.

SUMMARY OF THE INVENTION

In accordance with the present invention, there is provided a flexible, multi-layer material for packaging a polymer electrolytic cell or battery, comprising:

a first metallic foil layer;

a second metallic foil layer;

an intermediate separation layer disposed between said first and second metallic foil layer, said intermediate separation layer establishing a predetermined spacing between said first metallic foil layer and said second metallic foil layer;

a first self-sealing layer on said first metallic foil layer, the first self-sealing layer formed of a material having adhesive-like properties and having a thickness of less than about 76 $\mu$m; and a second self-sealing layer on the second metallic foil layer, the second self-sealing layer formed of a material having adhesive-like properties and having a thickness of less than about 76 $\mu$m.

In accordance with another aspect of the present invention, there is provided a flexible, multi-layer material for packaging a polymer electrolytic cell, comprising:

a first layer and a second layer of an aluminum foil, the aluminum foil layers having a thickness of about 2 $\mu$m to about 100 $\mu$m; and a layer of a thermoplastic material having a thickness of about 2 $\mu$m to about 100 $\mu$m disposed between the aluminum foil layers;

layers of a sealant-adhesive material applied to each of the aluminum foil layers, the adhesive layers formed of a thermoplastic polymer.

It is an object of the present invention to provide a laminate material for packaging an electrochemical device.

Another object of the present invention is to provide a laminate as described above for packaging an electrolytic cell or battery.

Another object of the present invention is to provide a laminate material as described above that is self-sealing upon the application of heat and pressure.

A still further object of the present invention is to provide a laminate material as described above having multiple layers of metal foil to insure hermetic packaging.

These and other objects will become apparent from the following description of a preferred embodiment taken together with the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF THE PREFERRED EMBODIMENT

Figure 1:
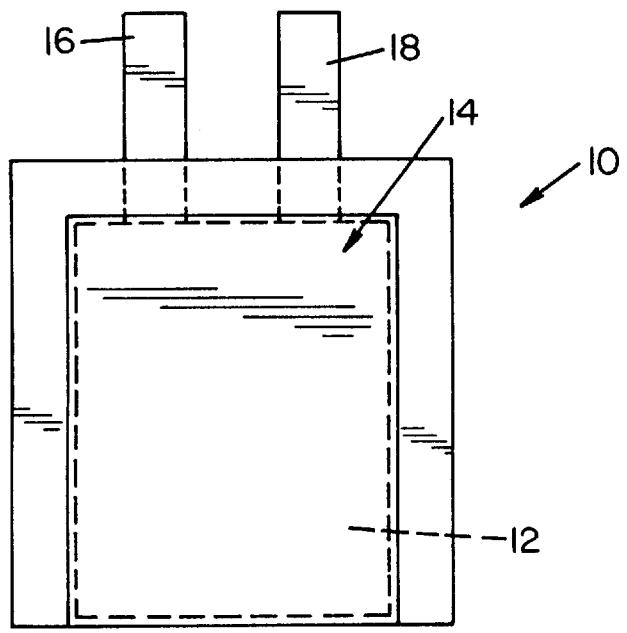
FIG. 1 is a plan view showing conventional battery package formed from a flexible laminate material.
Figure 2:
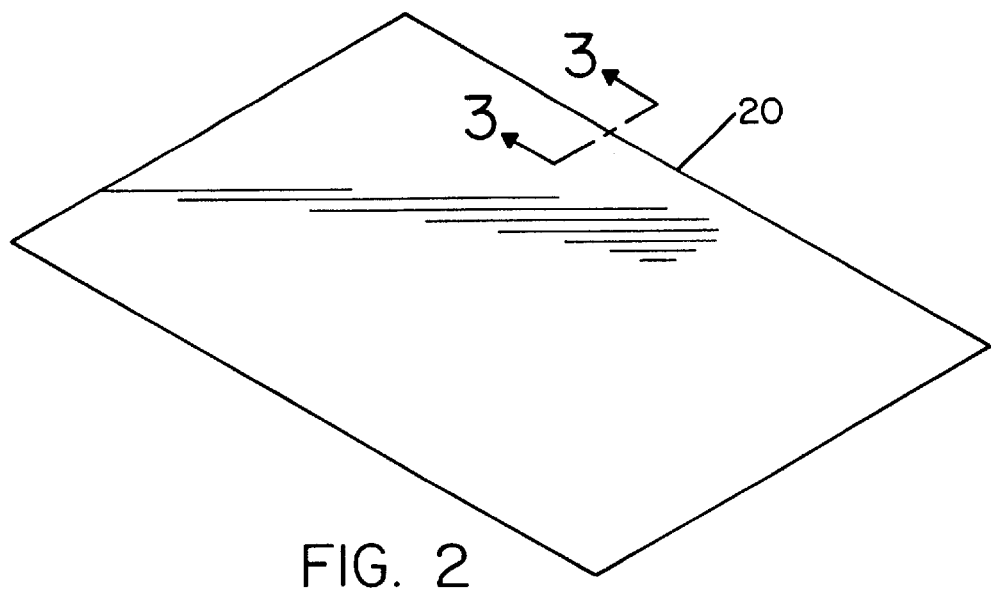
FIG. 2 is a sheet of laminate material used in forming the battery package shown in FIG. 1.

Referring now to the drawings wherein the showings are for the purpose of illustrating preferred embodiments of the invention only, and not for the purpose of limiting same, FIG. 1 illustrates a battery 10 having a package or enclosure 14 formed from a flexible, multi-layered material 20. Package 14 is adapted to enclose an electrochemical device. In the embodiment shown, a planar, solid electrolytic cell 12 having leads 16, 18 is shown. Package 14 is generally formed from a sheet of multi-layered material 20 by placing the rectangular cell(s) 12 onto one side of a sheet of multi-layered material 20. Cell(s) 12 is positioned such that a portion of each of leads 16, 18 is positioned on material 20, and a portion of leads 16, 18 extends beyond the edge of material 20. The other half of material 20 is then folded over onto cell 12 to overlay onto the other side of material 20. Material 20 is dimensioned such that when folded over, it extends beyond three peripheral edges of cell 12 such that the adhesive and sealant layer engages itself. Heat or pressure or both are applied to these three edges to form a seal about the periphery of cell 12. The method of forming a package 14 for battery 10 as heretofore described, as well as the shape of package 14, are generally conventionally known. In this respect, cell 12 and package 14, in and of themselves, form no part of the present invention. The present invention relates specifically to multi-layered material 20 for forming outer package 14.

In accordance with the present invention, material 20 is preferably a multi-layered structure and includes at least two layers of metallic foil, a separation layer between the two layers of metal foil and at least one layer of a pressure-sensitive or heat-sensitive, self-sealing material.

The two metal foil layers are provided as barrier layers to form a hermetic barrier within package 14. The metal foil layers are provided to prevent migration of air into the battery or cell, and/or solvents from the cell. The intermediate separation layer is provided to separate and "decouple" the metallic foil layers. Specifically, the separation between the metallic foil layers is provided to prevent alignment or registry of defects in the respective foil layers, such as pinholes or cracks, from destroying the hermeticity of the multi-layer material. In addition, a space between the metallic foils prevents cracks or punctures in one metallic foil layer from penetrating or propagating into the other. As shall be described in greater detail below, the separation layer may be comprised of a wide range of materials, and is primarily provided to create a space or separation between the two metallic foil layers. Preferably, in addition to creating a space between the two metallic layers the separation layer has mechanical properties to impart physical strength to package 14, namely tensile strength, penetration resistance and stiffness. The self-sealing layer is provided as an adhesive-like material that when heated and cooled, or under pressure or both will bond or join onto itself or onto one of the other layers of multi-layer material 20 and form a seal with any surface it may contact.

Referring now to the drawings, preferred embodiments of material 20 are illustrated in FIGS. 3A–3D. Each of the laminates shown in FIGS. 3A–3D is basically formed of layers of like materials that are merely arranged in a different order or grouping. In accordance with the preferred embodiment, the multi-layer materials shown in FIGS. 3A–3D each include at least two metallic foil layers. The metallic foil layers may be formed of like or dissimilar metal foils that are chosen to provide specific mechanical properties to multi-layer material 20. For example, one layer may be formed of aluminum foil, and the other layer formed of copper foil. Preferable metallic foils for use in material 20 are selected from a group consisting of aluminum, copper, nickel and stainless steel. The metallic foil layers preferably have a thickness of less than 100 $\mu$m (microns), more preferably, having a thickness of between 5 to 50 microns, and most preferably, having a thickness of between 5 to 12 microns. In preferred embodiments, both metal layers are formed of an aluminum foil.

Referring now to the intermediate separation layer, this layer may be formed of fabric, scrim, paper, a polymer film, an adhesive, another metallic foil or combinations thereof. In this respect, the intermediate separation layer may itself be formed of multiple layers. For example, the intermediate separation layer may be formed of a woven cloth having a layer of adhesive on both sides thereof to secure the cloth to each of the metallic layers. As indicated above, a primary function of the separation layer is to separate the metallic foil layers. In addition, the intermediate separation layer also provides structural strength to material 20. This is preferably accomplished by forming the intermediate separation layer from a material that possesses desired mechanical properties and securing such material to the metallic foil layers, for example, with additional layers of thin adhesive. In accordance with the present invention, the intermediate separation layer is preferably formed of a polymeric material. The polymeric material may be a film or a resinous material, and such film or resinous material may have adhesive-like properties, wherein the film itself or the resinous material itself will adhere to the metallic foil layers. A layer of adhesive material alone may also form the intermediate separation layer between the metallic foil layers.

The total thickness of the intermediate separation layer is preferably about 2 $\mu$m to about 100 $\mu$m, and more preferably, about 3 $\mu$m to about 18 $\mu$m. In preferred embodiments, the intermediate separation layer of material 20 is formed of a polymeric material, including but not limited to, thermoplastics, engineering thermoplastics, blends of the same, thermosets and blends of thermoplastics and thermosets. The polymeric material is bonded to the metallic layer by thin layers of adhesive. The polymeric layer is provided to separate one metal foil layer from the other metal foil layer or another material, and to provide strength to material 20. In a preferred embodiment, the intermediate separation layer is comprised of Mylar® bonded to the metallic foil layer by a thin layer of adhesive.

Referring now to the self-sealing layer, this layer preferably comprises at least one of the outer layers of the laminate. The self-sealing layer (or layers) is formed of a material that is either heat-sensitive or pressure-sensitive or both so as to bond to another layer of like material so as to enable formation of the battery package by a heat and/or pressure process. The self-sealing layer(s) may be formed of any mono, co-extruded or laminated material that is electrically insulating, and chemically and physically compatible with any component or components of the electrochemical device with which it may come in contact (e.g., it must not dissolve in the electrolyte solution of a battery). Representative of such materials are acrylics, ethylene acrylic acid (EAA) copolymers, EEA copolymer, ethylene methacrylic acid (EMA) copolymers, ethylene vinyl acetate (EVA) copolymers, polymethyl acrylate (PMA) acrylonitrite, vinyl chloride polypropylene (VCPP) copolymers, acrylic nitrile-butadiene-styrene (ABS) copolymers, polyethylene (PE) and polypropylene (PP), and rubber modified compounds of the foregoing. In a preferred embodiment, the self-sealing layer is formed of SURLYN® or NUCREL® thermoplastic materials manufactured by DuPont. The thickness of the self-sealing layer is less than about 76 µm, and more preferably, is between about 38 µm to about 64 µm.

The overall thickness of material 20 is preferably kept as thin as possible so that material 20 maintains sufficient flexibility to be wrapped about cell 12, as will hereinafter be described. At the same time, material 20 and its individual layers preferably have sufficient thicknesses to impart to material 20 the mechanical properties necessary to provide the toughness and hermeticity required of package 14. In this respect, the overall thickness of material 20 is preferably less than 152.4 µm, preferably in the range of about 60 µm to about 127.0 µm, and more preferably, in the range of about 101.6 µm to about 127.0 µm.

Figure 3A:
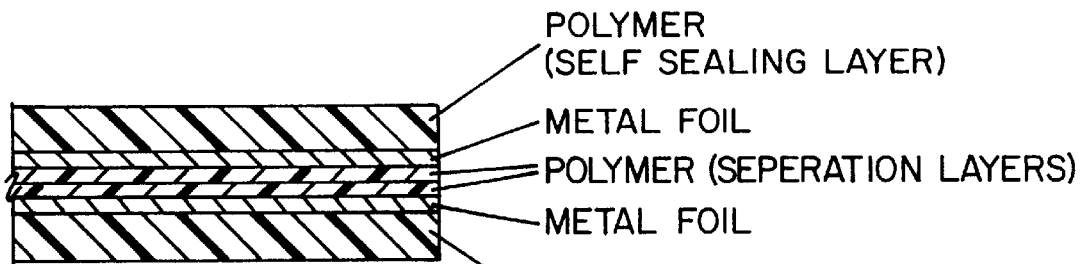
FIG. 3A is an enlarged cross-sectional view showing a flexible laminate illustrating a preferred embodiment of the present invention.

Referring now to the drawings, specific embodiments of the present invention are shown. FIG. 3A shows a preferred material 20 wherein the intermediate separation layer is comprised of two layers of a polymer film. The two polymer layers are sandwiched between two layers of metallic foil. Thin layers of adhesive (not shown) are preferably used to bond the structural, polymer layers, together and to the metallic foil layers. A self-sealing layer or adhesive is provided over each metallic foil layer.

Figure 3B:
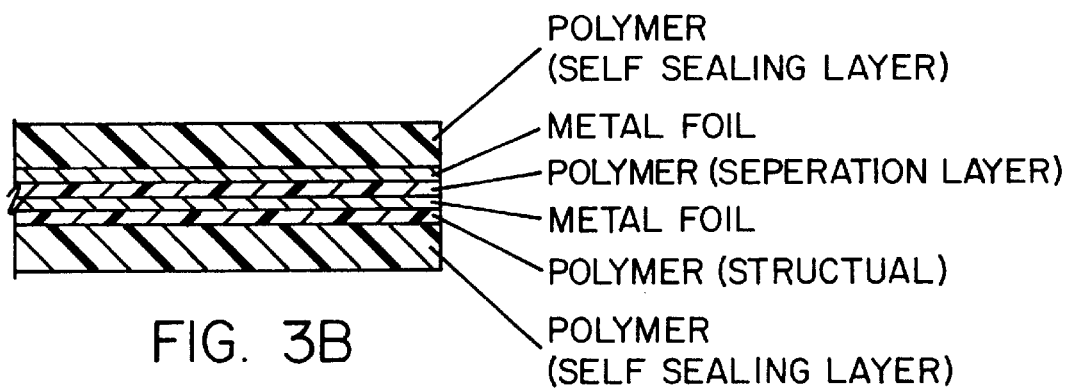
FIG. 3B is an enlarged cross-sectional view showing a flexible laminate illustrating a second embodiment of the present invention.

FIG. 3B shows a multi-layer material 20 wherein the inner layers of polymer material and metallic foil of FIG. 3A are rearranged to alternate. In this configuration, one of the polymer layers forms the intermediate separation layer between the two metallic foil layers and the other polymer layer is provided as an additional structural layer. As in the embodiment shown in FIG. 3A, adhesive (not shown) may be used to secure one or more layers to another layer. The two layers of metallic foil and two layers of polymer material are sandwiched between two layers of a self-sealing polymer.

Figure 3C:
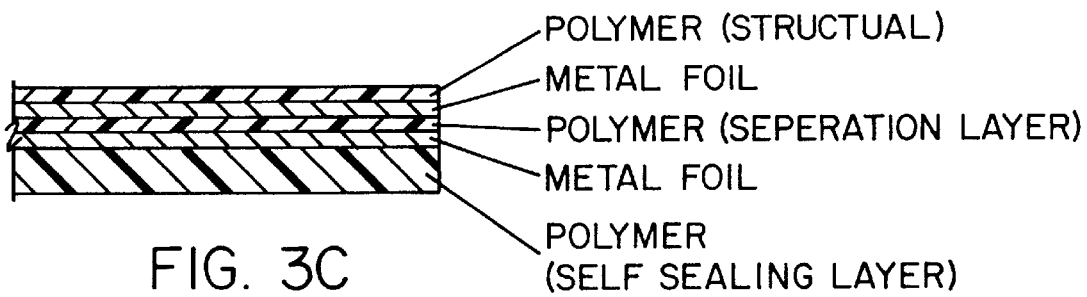
FIG. 3C is an enlarged cross-sectional view showing a flexible laminate illustrating a third embodiment of the present invention.

FIG. 3C shows a material 20 that is generally similar to that shown in FIG. 3B, except that the material has only one self-sealing layer. The self-sealing layer preferably covers a metallic foil layer.

Figure 3D:
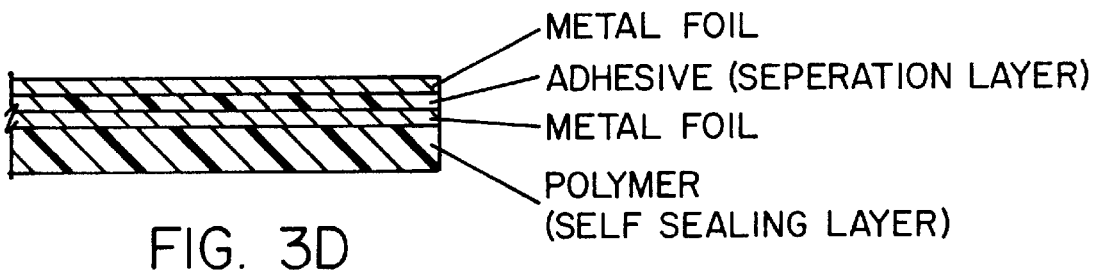
FIG. 3D is an enlarged cross-sectional view showing a flexible laminate illustrating a fourth embodiment of the present invention.

FIG. 3D shows a material comprised of two layers of metallic foil and a single layer of an adhesive forming the separation layer. A single layer of a self-sealing material is disposed over one metallic foil layer. In this embodiment, no reinforcing polymer is provided. In this embodiment, to bond the metallic foil layers to each other, an actual adhesive such as a pressure-sensitive adhesive is applied between the metallic foil layers.

The present invention thus provides a multi-layer material 20 having two layers of spaced-apart, metallic foil 24, 26 to improve the hermeticity of material 20. With two layers of metallic foil 24, 26, the possibility of a leak in package 14 is significantly reduced. Even if cracks or imperfections exist in both metallic foil layers 24, 26, because of the separation of the two metallic layers, the likelihood that such cracks or defects would be in registry (i.e., alignment) with each other is small. Thus, if fluid penetrates through a void or crack in one metallic layer, it must travel laterally along the planes of the respective layers to reach another void or crack in the second metallic foil layer. Migration of fluid through the planes of material 20 significantly retards seepage and significantly reduces the likelihood that such seepage will leak through the second metallic foil layer. By providing two, spaced-apart layers of metallic foil, the hermeticity of the package is improved, together with the physical strength thereof.

The foregoing is a description of a preferred embodiment of the present invention. Numerous alterations and modifications will occur to those skilled in the art upon a reading of the present specification. It will be obvious to those skilled in the art that two or more layers of metal foil to provide durable hermeticity can be combined with numerous other combinations of structural and/or adhesive polymer layers to achieve desired degrees of strength, flexibility, durability, thickness, weight, adhesive strength, etc. For example, other types of adhesive besides thermoplastic can in principle be used, for example, contact adhesives. Sealing methods may include heat, pressure, ultrasonic, RF induction, etc., and combinations thereof. It is intended that all such modifications and alterations be included insofar as they come within the scope of the invention as claimed or the equivalents thereof.

Having described the invention, the following is claimed:

1. A flexible, multi-layer material for packaging a polymer electrolytic cell or battery, comprising:

a first aluminum foil layer;

a second aluminum foil layer;

an intermediate separation layer formed of a polymeric material disposed between said first and said second aluminum foil layers, said intermediate separation layer establishing a predetermined spacing between said first aluminum foil layer and said second aluminum foil layer;

a first layer formed of a first self-sealing material on said first aluminum foil layer, said first layer having a thickness of less than about 76 µm; and a second layer formed of a second self-sealing material on said second aluminum foil layer, said second layer having a thickness of less than about 76 µm, said first and second layers being the outermost layers of material.

2. A flexible material as defined in claim 1, wherein said first and second aluminum foil layer have a thickness of between about 2 µm and about 100 µm.

3. A flexible material as defined in claim 2, wherein said first and second aluminum foil layer have a thickness of between about 3 µm and about 18 µm.

4. A flexible material as defined in claim 1, wherein said first and second self-sealing layers are formed of a material selected from the group consisting of acrylics, ethylene acrylic acid (EAA) copolymers, ethylene and ethyl acrylate (EEA) copolymers, ethylene methacrylic acid (EMA) copolymers, ethylene vinyl acetate (EVA) copolymers, polymethyl acrylate (PMA), acrylonitrite, vinyl chloride polypropylene (VCPP) copolymers, acrylic nitrile-butadiene-styrene (ABS) copolymers, polyethylene (PE), polypropylene (PP) and rubber modified compounds of the foregoing.

5. A material as defined in claim 1, wherein said intermediate separation layer is formed from a material selected from the group consisting of woven fabric, scrim, polymer film, adhesive, resin film and combinations and/or laminates thereof.

6. A material as defined in claim 5, wherein said intermediate separation layer has a thickness of between 2 µm and 100 µm.

7. A material as defined in claim 1, wherein said self-sealing layer or layers is formed of a pressure-sensitive material.

8. A material as defined in claim 1, wherein said self-sealing layer or layers is formed of a thermoplastic or thermosetting heat-sensitive material.

9. A material as defined in claim 1, wherein said self-sealing layer is formed of a polyolefin material.

10. A flexible, multi-layer material for packaging a polymer electrolytic cell or battery, comprising:
   a first aluminum foil layer;
   a second aluminum foil layer;
   an intermediate separation layer formed of a polymeric material disposed between said first and said second aluminum layers, said intermediate separation layer establishing a predetermined spacing between said first aluminum foil layer and said second aluminum foil layer;
   a first layer formed of a first self-sealing material on said first aluminum foil layer, said first layer having a thickness of less than about 76 $\mu$m; and
   a second layer formed of a second self-sealing material on said second aluminum foil layer, said second layer having a thickness of less than about 76 $\mu$m, wherein said self-sealing layer is an ethylene vinyl acetate blend.

11. A flexible laminate for packaging a polymer electrolytic cell, comprising:
   a first and a second layer of aluminum foil, each of said aluminum foil layers having a thickness of about 2 $\mu$m to about 100 $\mu$m;
   an inner separation layer of a thermoplastic material having a thickness of about 2 $\mu$m to about 100 $\mu$m disposed between said aluminum layers; and
   a layer of a self-sealing, adhesive material applied to each of said aluminum foil layers, wherein said aluminum layers and said separation layer are disposed between each layer of said self-sealing, adhesive material, said adhesive layers being formed of a thermoplastic polymer and forming the outermost layers of said laminate.

12. A flexible laminate as defined in claim 11, wherein said inner layer is formed of a polyester.

13. A flexible laminate as defined in claim 12, wherein said adhesive layers are formed of a material selected from the group consisting of acrylics, ethylene acrylic acid (EAA) copolymers, ethylene and ethyl acrylate (EEA) copolymers, ethylene methacrylic acid (EMA) copolymers, ethylene vinyl acetate (EVA) copolymers, polymethyl acrylate (PMA), acrylonitrite, vinyl chloride polypropylene (VCPP) copolymers, acrylic nitrile-butadiene-styrene (ABS) copolymers, polyethylene (PE), polypropylene (PP) and rubber modified compounds of the foregoing.

14. A flexible, multi-layer material for packaging a polymer electrolytic cell or battery, comprising:
   a first copper foil layer;
   a second copper foil layer;
   an intermediate separation layer formed of a polymeric material disposed between said first and said second copper foil layers, said intermediate separation layer establishing a predetermined spacing between said first copper foil layer and said second copper foil layer;
   a first layer formed of a first self-sealing material on said first copper foil layer, said first layer having a thickness of less than about 76 $\mu$m; and
   a second layer formed of a second self-sealing material on said second copper foil layer, said second layer having a thickness of less than about 76 $\mu$m, said first and second layers of self-sealing material being the outermost layers of said material.

15. A flexible material as defined in claim 14, wherein said first and second copper foil layer have a thickness of between about 2 $\mu$m and about 100 $\mu$m.

16. A flexible material as defined in claim 15, wherein said first and second copper foil layer have a thickness of between about 3 $\mu$m and about 18 $\mu$m.

17. A flexible material as defined in claim 14, wherein said intermediate separation layer has thickness of between 2 $\mu$m and 100 $\mu$m.

18. A flexible material as defined in claim 14, wherein said first and second self-sealing layers are formed of a material selected from the group consisting of acrylics, ethylene acrylic acid (EAA) copolymers, ethylene and ethyl acrylate (EEA) copolymers, ethylene methacrylic acid (EMA) copolymers, ethylene vinyl acetate (EVA) copolymers, polymethyl acrylate (PMA), acrylonitrite, vinyl chloride polypropylene (VCPP) copolymers, acrylic nitrile-butadiene-styrene (ABS) copolymers, polyethylene (PE), polypropylene (PP) and rubber modified compounds of the foregoing.

* * * * *